3,655,742
PROCESS FOR PRODUCING MAGNESIUM PROBENECID TETRAHYDRATE
David J. Morgans, North Wales, Joseph F. Bavitz, Willow Grove, and Robert A. Castello, Doylestown, Pa., assignors to Merck & Co., Inc., Rahway, N.J.
No Drawing. Continuation-in-part of application Ser. No. 722,821, Apr. 17, 1968. This application Feb. 10, 1969, Ser. No. 798,109
Int. Cl. C07c *101/42*
U.S. Cl. 260—518 R                    2 Claims

ABSTRACT OF THE DISCLOSURE

Magnesium probenecid tetrahydrate, an antigout therapeutic agent, is produced in high yield by a controlled reaction of probenecid acid and magnesium carbonate or equivalent magnesium salt.

PRIOR ART

See parent Ser. No. 722,821.

RELATED CASES

Parent case Ser. No. 722,821, of which this is a continuation-in-part.

This invention relates to pharmaceutical preparations and particularly to tablets containing probenecid as the tetrahydrate, magnesium salt. The invention includes this compound and the process for its preparation.

Probenecid containing tablets of the past have been objectionable because of their slow disintegration time. As probenecid is one of the principal agents used to lessen the extreme pain of gout, it is important that the tablet disintegrate quickly after oral ingestion so that the probenecid is rapidly released and can be absorbed systemically. Probenecid is also often given with penicillin as the probenecid serves to prevent urinary excretion of the penicillin. In this use, the probenecid must be released quickly from the tablet so that its inhibitory activity against penicillin excretion will be available promptly.

Past efforts to make a quickly disintegratable tablet containing probenecid have been unsuccessful because the tablets have been so fragile that they would not withstand transit shocks. Efforts to make a more rugged tablet have had the objection that their disintegration has been much too slow or has not occurred at all.

The reason for the past inability to make quickly disintegratable tablets containing probenecid resided in the unusual physical nature of this drug. It is a rather sticky, poorly compressible solid. To overcome these objectionable characteristics and to facilitate the tablet compression operation, large amounts of powdered excipients have been added. The resulting compositions, while more dry and free-flowing, produced very fragile tablets. A sufficiently high compression to overcome this fragility has often resulted in a tablet of such firmness that it has disintegrated very slowly on ingestion. Indeed, this has even been reflected in the long disintegration time (60 minutes) allowable in the USP standard for probenecid tablets.

In accordance with the invention, these probelms have been overcome by converting over 71% of the probenecid to its magnesium salt and retaining it in a tetrahydrate form. This chemical conversion produces a substance which is not sticky and therefore does not require an exceptionally large amount or any unusual powdered excipients for granulation and tablet compression. Although equally hard or harder, the tablet made from the magnesium probenecid tetrahydrate will disintegrate in one-fourth to one-third of the time required for the hard, nonfragile granulated tablets ordinarily made from the sticky probenecid. In addition to being in a dry readily compressible form, magnesium probenecid tetrahydrate also is water soluble, probenecid (acid) is quite insoluble.

The magnesium probenecid tetrahydrate is of especial value over the potassium salt because potassium ions are known to cause gastric distress. As relatively large amounts of probenecid (as its free acid) must be consumed daily, averaging about two grams, an excessive amount of potassium would be ingested in the case of potassium probenecid. In like manner, sodium probenecid is objectionable because sodium is contraindicated in cardiac and hypertensive patients. Another advantage of the magnesium probenecid is that its tetrahydrate will withstand heating at a temperature up to 50° C. without losing its water of hydration.

The magnesium probenecid tetrahydrate of this invention is readily made by chemically combining probenecid with magnesium carbonate. In order to obtain a high chemical yield of the reaction product necessary to optimize disintegration, it is important that the reaction be conducted under such controlled conditions that the tetrahydrate form of the probenecid salt is formed and retained. To accomplish this the following conditions must be met:

(a) a high intensity mixer must be used, (b) the probenecid and magnesium carbonate, e.g. are added dry to the mixer, (c) water at 25°–90° C. (preferably 80°–90° C.) is added at the rate of 400–600 ml. (preferably 500 ml.) per minute, (d) the reaction mixture is controlled so that the temperature does not exceed 40–45° C. by circulating cooling water around the reaction chamber, and (e) continuing the operation until a minimum conversion of 95% of the magnesium carbonate to the probenecid salt has taken place. Instead of the carbonate other inorganic acid salts such as magnesium phosphate or magnesium bicarbonate may be used.

In this reaction, all of the probenecid will not be converted to the magnesium salt considered from a practical viewpoint. However, the product of the reaction mixture which is used in making the tablet should contain at least 71% of the probenecid in the form of magnesium probenecid tetrahydrate. That is, some unconverted probenecid may remain when the process is conducted as a commercial operation but unless 71% or more of the assayable probenecid present in the tablet is present as the magnesium probenecid tetrahydrate, the quick disintegration time which is a feature of this invention will not be present.

The invention includes tablets in which from 71 to 100% of the probenecid present is in the magnesium-tetrahydrate form. The 100% content can be obtained by adding at least a stoichiometric amount of magnesium carbonate and prolonging the above mentioned reaction to completion or by extracting with water the water-soluble magnesium probenecid tetrahydrate from the reaction, thus separating it from the water-insoluble probenecid acid. As a practical matter the reaction will convert 71 to 75% of the probenecid to its magnesium-tetrahydrate form, corresponding to from 95 to 100% conversion of the magnesium carbonate.

Some magnesium probenecid tetrahydrate is present in the commercially obtainable probenecid tablets mentioned above; this is because magnesium carbonate is added to the granulation mixture to serve as a binder in the tablet and a slight reaction with the probenecid acid occurs up to the time of compression of the tablets. However, this fortuitous conversion may occur only to the extent of 10 to 20% so that from 80–90% of the probenecid remains as the acid in the final tablet. This accounts for the inability to obtain a satisfactory tablet in the past.

The magnesium probenecid tetrahydrate is used in making a granulation of a conventional nature. In the drying steps of the granulation procedure, however, care should be taken to keep a temperature below 50° C. to prevent loss of the tetrahydrate form. Customary granulation additives may be used such as starch, gelatin, acacia, etc; a suitable one being a mixture of 2.100 kg. starch and 0.120 kg. gelatin. The granulation should be accomplished in a relatively short time such as 2 to 4 minutes.

The invention lends itself to the incorporation of other therapeutic agents. For example, penicillin can be added into the dried reaction mix prior to granulation so that the resulting tablet would contain on the order of 250 mg. of probenecid (as the free acid) and 250,000 units of potassium penicillin. Or, colchicine may be added so that each tablet contains 0.5 mg. of colchicine and 500 mg. of probenecid (as the free acid).

Representative examples are the following:

EXAMPLE 1

30 kg. probenecid powder USP are dryblended with 3.75 kg. magnesium carbonate N.F. in a Littleford-Lodige or other high intensity mixer. 18 kg. of water (80°–90° C.) are added at the rate of 500 ml./minute. The reaction mixture is controlled at 40°–45° C. by circulation of water in the jacket of the mixture. The reaction can be continued for one hour and assayed to insure minimum 95–100% conversion of the magnesium carbonate to magnesium probenecid tetrahydrate. The probenecid acid will undergo a 71–75% conversion to the magnesium tetrahydrate form.

The mixture is oven dried at a temperature not above 50° C. and the dried mixture granulated with starch-gelatin paste (14.0 kg.) containing 2.100 kg. starch and 0.120 kg. gelatin. The granulation is performed in 2 to 4 minutes, preferably in a planetary mixer. The granulation is oven dried at a temperature not above 50° C. blended with 10% corn starch and 1.0% calcium stearate and compressed at a maximum of 7400 lbs. pressure into tablets.

This preparation will prepare approximately 60,000 tablets, each containing the equivalent of 500 mg. of probenecid as the free acid. An adult person having gout would take one or two of these tablets, three to four times daily. After ingestion, the magnesium probenecid tetrahydrate is converted rather quickly so that the free probenecid is released.

The tablets are hard and strong enough to withstand shipping jolts. When these tablets and commercial Benemid tablets are subjected to the same tests for hardness and disintegration, time, tablets made according to the invention will disintegrate in one-fourth to one-third the time of disintegration of Benemid tablets although of equal hardness. Hardness tests are made in a standard Stokes Gun for this purpose and disintegration times are measured in water. The following are the result of representative tests:

|  | Hardness, kg. | Disintegration time, minutes |
| --- | --- | --- |
| Example 1, tablets | 10–11.5 | 10–16 |
| Benemid tablets | 7–8.5 | 60 |

EXAMPLE 2

By substituting in Example 1, for the magnesium carbonate, an equivalent weight of either magnesium bicarbonate or magnesium phosphate, the desired magnesium probenecid tetrahydrate is obtained.

EXAMPLE 3

Example 1 is carried out but the water which is added is within the 25°–80° C. temperature range and is added at 400 ml. (or 600 ml.) per minute.

EXAMPLE 4

Example 1 is carried out but using 5.0 kg. of magnesium carbonate N.F. After about two hours, practically 100% of the probenecid will be converted to the desired magnesium probenecid tetrahydrate.

What is claimed is:

1. The process for making magnesium probenecid tetrahydrate which comprises mixing together at a high intensity in the following ratio, 30 kg. probenecid, 3.75 to 5.00 kg. of a magnesium inorganic acid salt, and 18 kg. of water at 25°–90° C. at the rate of 400–600 ml. per minute, maintaining the reaction mixture between 40–45° C. and continuing the reaction until at least a 95% conversion of the starting magnesium salt to magnesium probenecid tetrahydrate has occurred.

2. The process according to claim 1 in which the water is at 80°–90° C. and is added at the rate of 500 ml. per minute.

References Cited

UNITED STATES PATENTS 3,346,568   10/1967   Schmidt et al. _____ 260—518

LORRAINE A. WEINBERGER, Primary Examiner

L. A. THAXTON, Assistant Examiner